US006242539B1

(12) United States Patent
Tadokoro et al.

(10) Patent No.: US 6,242,539 B1
(45) Date of Patent: *Jun. 5, 2001

(54) PROCESS FOR PRODUCTION OF CHLORINATED POLYVINYL CHLORIDE RESIN

(75) Inventors: Tadashi Tadokoro; Takeyuki Suzuki, both of Hyogo; Minoru Isshiki, Shiga, all of (JP)

(73) Assignee: Kaneka Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/119,386

(22) Filed: Jul. 20, 1998

(30) Foreign Application Priority Data

Jul. 29, 1997 (JP) .................................................. 9-202888

(51) Int. Cl.⁷ ........................................................ C08F 8/22
(52) U.S. Cl. ........................ 525/356; 525/331.6; 525/358
(58) Field of Search ...................................... 525/356, 358

(56) References Cited

U.S. PATENT DOCUMENTS

| 4,049,517 | * | 9/1977 | Adachi et al. | ................... 525/356 |
| 4,412,898 | | 11/1983 | Olson et al. . | |

FOREIGN PATENT DOCUMENTS

| 421150 | 4/1991 | (EP) . |
| 556625 | 8/1993 | (EP) . |
| 58-103507 | 6/1983 | (JP) . |
| 01006002 | 1/1989 | (JP) . |
| 4-185617 | 7/1992 | (JP) . |
| 09095513 | 4/1997 | (JP) . |

* cited by examiner

*Primary Examiner*—Bernard Lipman
(74) *Attorney, Agent, or Firm*—Jordan and Hamburg LLP

(57) ABSTRACT

A polyvinyl chloride resin having an average particle diameter of not less than 150 μm and porosity at 31–1,011 psi of not less than 0.15 cc/g is suspended in an aqueous medium and chlorinated by blowing gaseous chlorine into the aqueous suspension. In this way, floating resin formation during chlorination can be prevented and a chlorinated polyvinyl chloride resin excellent in free flow property and showing good resistance to initial discoloration and good thermal stability in heating and molding processes can be produced.

9 Claims, No Drawings

PROCESS FOR PRODUCTION OF CHLORINATED POLYVINYL CHLORIDE RESIN

BACKGROUND OF THE INVENTION

1. Field of the Invention

The present invention relates to a process for the production of chlorinated polyvinyl chloride resin. More particularly, it relates to a process for producing chlorinated polyvinyl chlorides which process prevents the formation of floating resin in the step of chlorination and yields a chlorinated polyvinyl chloride resin excellent free flow property and in further, which is superior in initial coloring as well as heat stability at a time of molding with application of heat.

2. Prior Art

A chlorinated polyvinyl chloride resin (hereinafter referred to as "CPVC") can be obtained by chlorination of polyvinyl chloride resin (hereinafter referred to as "PVC"). Processes for chlorinating PVC suspended in an aqueous medium are known in the prior art and described, for example, in Japanese Laid Open Patent specifications Kokai Sho 58-103507 (1983) and Sho 64-6002 (1989).

When CPVC is chlorinated in aqueous suspension, the resins tend to float up, and because of this tendency, in the step of discharging the resins from the reaction vessel after completion of the reaction, the resins may partly remain in the vessel undischarged, or in the step of transportation of resin slurries, these may cause pump cavitation troubles. For these and other reasons, productivity is low.

On the other hand, CPVC is characterized by its higher heat resistance as compared with PVC, and therefore is used in manufacturing pipes, joints, industrial plates, sheets or the like where heat resistance is required.

However, CPVC is inferior in heat stability to PVC, and therefore, it easily undergoes scorching during molding processes, and hence is not suited for long time processing for molding. Discoloration troubles thus may be encountered in transparent moldings production, for instance.

Further, CPVC easily becomes electrified and therefore its free flow property is not good. For this reason, these resin tend to cause blocking of the hopper of an extruder, disturbing the intended constant extrusion, among other problems.

For these reasons, as a measure for resin floating, a technology was proposed in Japanese Laid Open Patent specification Kokai Hei 9-95513 (1997). The proposed method comprises chlorinating a PVC obtained by suspension polymerization in the presence of a specific amount of a specific polyvinyl alcohol as a suspending agent. This method indeed improves productivity since the floating resin problem can be avoided.

However, this proposed method is not yet free from the problems of heat stability in molding processes and/or discoloration of moldings, for transparent applications. In addition, the free flow property problem is still to be solved and, therefore, a constant extrusion operation is often difficult to achieve because of blocking of the hopper of the extruder, among other problems.

It is an object of the present invention to provide a novel process for the production of chlorinated polyvinyl chloride resin (CPVC), which prevents resin floating in the chlorination process and gives CPVC having excellent free flow property and further showing good resistance to initial discoloration as well as good heat stability at the time of heating and molding processing.

SUMMARY OF THE INVENTION

As a result of an intensive study made by the inventors of the present invention to solve the above-mentioned problems, the inventors found that in chlorinating PVC in aqueous suspension, if the PVC has a specific average particle diameter as well as specific porosity, the resin floating problem at the time of chlorination can be prevented, and the CPVC obtained by this process has excellent free flow property and that, in addition, the CPVC shows good resistance to initial discoloration and good heat stability in the heating and molding process, and they have now completed this invention.

More precisely, the process for the production of CPVC according to the present invention is characterized in that a PVC having an average particle diameter not less than 150 $\mu$m and porosity not less than 0.15 cc/g at 31–1,011 psi is suspended in an aqueous medium in a reaction vessel and the above-mentioned chlorination reaction of PVC is carried out in said aqueous suspension.

By this invention, a process for the production of CPVC can be provided, which prevents resin floating in the chlorination process and gives CPVC having excellent free flow property and further showing good resistance to initial discoloration as well as good heat stability in the heating and molding process.

DETAILED DESCRIPTION OF THE INVENTION

THE PVC in the present invention includes homo—and copolymers of vinyl chloride.

Monomers copolymerizable with vinyl chloride monomer are for example ethylene, propylene, vinyl acetate, allyl chloride, allyl glycidyl ether, acrylic acid esters, methacrylic acid esters, vinyl ethers and the like. These monomers may be used alone or in combination. The amount of these comonomers, when used, is about 0–20 parts by weight per 100 parts by weight of vinyl chloride monomer.

The average polymerization degree of PVC is not particularly limited. Since the obtained CPVC is mainly used in the production of pipes, joints, industrial plates, sheets or the like, the average polymerization degree of PVC is preferably in the range of 400–2,000. When the average polymerization degree is lower than 400, the impact strength of molded CPVC products is insufficient, and when it is over 2,000, the melt viscosity of CPVC is too high, rendering processing thereof very difficult.

The term "average particle diameter" as used herein means the value which is calculated from a cumulative distribution by using standard sieves of 42 mesh, 60 mesh, 80 mesh, 100 mesh, 120 mesh, 150 mesh and 200 mesh, according to the test method of JIS Z 8801.

The average particle diameter of PVC in this invention is limited to not less than 150 $\mu$m. When the average particle diameter is less than 150 $\mu$m, resin floating tends to occur at the time of chlorination, and the obtained CPVC may have low free flow property.

The use of a PVC having an average particle diameter of not less than 200 $\mu$m is more preferable since resin floating at the time of chlorination and the free flow property of the obtained CPVC can be further improved. The term "porosity at 31–1,011 psi" as used herein means the value obtained by dividing, by the resin weight, the total volume, measured with a mercury penetration method porosimeter at 31–1,011 psi, of porosity occurring in the vinyl chloride resin and having an average diameter of 5.9–0.17 $\mu$m.

In the present invention, the porosity of PVC at 31–1,011 psi is limited to not less than 0.15 cc/g. When the said porosity value is below 0.15 cc/g, the gelation property of CPVC is deteriorated and/or the resistance to initial discoloration and the heat stability become poor.

When the above-mentioned porosity value is not less than 0.19 cc/g and the bulk density is not less than 0.54 g/cc, the resin floating-preventing effect resulting from said average particle diameter, free flow property improving effect resulting from said bulk density and the initial discoloration resistance and heat stability improving effect in the heating and molding process as resulting from said porosity can preferably be increased.

The chlorination process for obtaining CPVC by chlorination of PVC is carried out in a conventional manner in aqueous suspension. There is no particular limitation imposed on this process. The process comprising blowing gaseous chlorine into PVC under irradiation with a mercury lamp, which is the simplest one from the equipment viewpoint, is preferred, however.

The temperature at the time of chlorination is preferably 40–90° C. from the plant's corrosion resistance viewpoint and also for improving the resistance to initial discoloration as well as the heat stability of the obtained CPVC.

Further, the chlorination is preferably conducted in a pressure range of 0–1.5 kg/cm$^2$ G from the viewpoint of plant's resistance to corrosion and pressure.

The preventive effect on the resin floating during the chlorination reaction, and the improving effect on the free flow property of the obtained CPVC and on the resistance to initial discoloration and the heat stability, in the heating and molding step become optimal when the PVC used is one produced by suspension polymerization in the presence of at least one polyvinyl alcohol species as a suspending agent and in the presence of a chain transfer agent (added to the polymerization system).

On that occasion, the polyvinyl alcohol to be used is preferably one having a degree of hydrolysis of 65–93 mole %.

The above-mentioned chain transfer agent is not particularly limited, but can be selected from among 2-mercaptoethanol, 3-mercaptopropanol, thiopropylene glycol, thioglycerrol, thioglycolic acid, thiohydroacrylic acid, thiolactic acid, thiomahic acid, thioacetic acid, iso-octyl thioglycolate, n-butyl 3-mercaptopropionate, n-butyl thioglycolate, glycol dimercaptoacetate, trimethylolpropane trithioglycolate, alkylmercaptanes and the like.

The chlorination degree of the CPVC obtainable by this invention is not particularly limited, but it is preferably 60–73% by weight. More preferably, it is 62–70% by weight from the viewpoint of excellent processability in the heating and molding process.

EXAMPLES

Hereinafter, the present invention will be described in more detail by way of the following Examples and Comparative Examples, but the invention is not limited to the following Examples.

In the following description, "part(s)" and "%" means "part(s) by weight" and "% by weight" respectively unless otherwise specified.

The characteristic properties of the respective polyvinyl chloride resins were measured by the following test methods.

Average Particle Diameter

The standard sieves prescribed in JIS Z 8801 (42 mesh, 60 mesh, 80 mesh, 100 mesh, 120 mesh, 150 mesh and 200 mesh) were used, and, from the cumulative weight distribution curve, the particle diameter correspoinding to 50% by weight was determined as the average particle diameter.

Porosity

A "porosimeter" made by AMINCO CO., LTD. was used. Approximately 0.2 g of the polyvinyl chloride resin was accurately weighed and poured into a penetrometer. And then, this penetrometer was set in a pressure reduction unit, and after reducing the pressure to not more than 0.1 Torr, the pressure was allowed to return to atmospheric pressure while simultaneously the penetrometer was filled with mercury in order to cause mercury to penetrate into the pores of the polyvinyl chloride resin. Then, the penetrometer was set in a pressurizing unit filled with isopropanol, and then, by increasing the pressure gradually, the relationship between the volume of penetrated mercury and the pressure was determined and the porosity between 31 psi and 1,011 psi, was determined. The porosity was expressed in terms of cc/g, ie. cc per gram of the polyvinyl chloride resin.

Bulk Density

The bulk density was measured according to JIS K 6721, and by using a bulk density measuring instrument made by TOYO SEIKI CO. The measurement results are shown in terms of cc/g.

Viscosity Average Polymerization Degree

The measurements were conducted according to JIS K 6721.

On the other hand, the free flow property test, the heat stability test and the initial color measurement were carried out as follows.

Free Flow Property Test 100 g of CPVC or a formulation thereof was placed in a small-size funnel, and the pass through time until all of the resin or compound discharged from the funnel was measured. The funnel was tightly connected with a conical beaker for receiving the resin or formulation discharging from the funnel so that the system was airtight.

The formulation used for this free flow property test is as in the following Table 1, and each of the formulations described hereinbelow was prepared by hot-blending using a Henshel mixer.

TABLE 1

| CPVC | 100 parts |
|---|---|
| MBS (KaneAce B-561 made by Kanegafuchi Chem., Co.) | 6 parts |
| Chlorinated polyethylene | 3 parts |
| Tin stabilizer (octyltin - mercaptide) | 2 parts |
| Polyethylene wax | 2 parts |
| Titanium oxide | 5 parts |

Heat Stability Test

50×40 mm sheet specimens cut from each of the roll milled sheets were put in a gear oven which was heated up to 200° C. and kept constantly at that temperature, and the specimens were taken out one by one from the gear oven every 15 minutes, and evaluated by eye for the extent of blackening. The time required until changing to black color (blackening time:minutes) was determined.

Initial Color

By using a color difference meter (Σ80 COLOR MEASURING SYSTEM made by NIPPON DENSHOKU KOGYO CO.), the "a value" (redness) of the pressed plate was measured.

For evaluating each CPVC for physical properties, the following formulation was roll-milled and pressed to make specimens, which were submitted to the following tests.

Physical Property Tests of CPVC

Using the CPVC obtained in Examples and Comparative Examples, formulations of the following Table 2 were prepared.

TABLE 2

| CPVC | 100 parts |
|---|---|
| MBS (KaneAce B31 made by Kanegafuchi Chem. Co.) | 10 parts |
| Tin stabilizer (octyltin - mercaptide) | 2 parts |
| Stearic acid | 1 parts |
| Paraffin wax | 0.7 parts |

Each of these formulations was roll-milled at 190° C. for 3 minutes with a 0.2 mm clearance. Specimens, 50 mm(vertical)×40 mm (width) in size, were cut out from each roll-milled sheet, and subjected to heat stability testing. On the other hand, the obtained sheets of each formulation were piled up and pressed together at 200° C. for preparing a pressed plate with a thickness of 3 mm. The "a value" (redness) of the plate was measured by using the color difference meter.

Example 1

A stainless autoclave equipped with a stirrer was charged with 120 parts of deionized water, 0.08 part of polyvinylalcohol (degree of hydrolysis: 79.5 mole %, viscosity of 4% aqueous solution at 20° C.: 41.0 cps), 0.004 part of 2-mercaptoethanol and 0.04 part of t-butyl peroxyneodecanoate as an oil-soluble polymerization initiator. Then, after evacuation of the autoclave, 100 parts by weight of vinyl chloride was injected thereinto under pressure. The polymerization reaction was then carried out at 58° C. for 5 hours with stirring, to give a PVC.

Next, 15 kg of the above-mentioned PVC powder and 35 kg of ion-exchanged water were charged into a chlorination reaction vessel, and stirred thoroughly. Then, the inside air was suctioned out by vacuum pumping to thereby keep the inside air pressure at −0.6 kg/cm$^2$ G for 10 minutes.

Therafter, the remaining oxygen gas was further purged by passing nitrogen gas through the reactor, and again suctioned by vacuum pumping while keeping the above-mentioned pressure for 10 minutes, for further removal of oxygen.

Next, chlorine gas was fed into the vessel, and after 10 minutes of charging of the vessel with chlorine gas, the chlorination reaction was carried out while keeping the pressure at 0.2 kg/cm$^2$ G and irradiating the vessel contents with UV using a high-pressure mercury lamp, 100 W in the initial stage and 200 W after the lapse of 2 hours. The chlorination reaction temperature was initially 40° C., then raised to 75° C. in 1.5 hours and thereafter kept at 75° C. constantly.

The chlorination degree was calculated from the hydrogen chloride concentration of the reaction solution, and the mercury lamp beaming was terminated at the point of 67% chlorine content along with stopping of the chlorine gas supply. Simultaneously the reaction vessel was cooled down and the remaining chlorine gas was purged with nitrogen gas, and the chlorination reaction was then completed.

After purging of the remaining chlorine gas, the slurry was discharged from the bottom of the reaction vessel with continuous stirring. The slurry discharged was resinous and uniform. Almost no resin was found remaining in the vessel. After dehydration of the slurry discharged and washing with deionized water, followed by draining and drying a white CPVC powder was obtained. The obtained CPVC was subjected to physical properties testing.

Comparative Example 1

A PVC was obtained by the same PVC process as in Example 1 without using 0.004 part by weight of 2-mercaptoethanol.

Using this PVC, a white CPVC powder was obtained by the same chlorination reaction as in Example 1. On the occasion of slurry discharge, the slurry discharged was resinous and uniform. Almost no resin was remaining in the reaction vessel. The obtained CPVC was subjected to physical properties testing.

Comparative Example 2

A PVC was obtained by the same PVC polymerization process as in Example 1 except that the use of 0.004 part by weight of 2-mercaptoethanol was omitted and instead of 0.08 part by weight of polyvinylalcohol as the suspending agent, 0.05 part by weight of hydroxypropylmethylcellulose (methoxyl group content 21.5%, hydroxypropoxyl group content 8.0% was used).

Using this PVC, a white CPVC powder was obtained by the same chlorination reaction as in Example 1. On the occasion of slurry discharge, a nonviscous slurry of lower resin concentration was discharged at the early stage of discharge and a muddy slurry of higher resin concentration was discharged at the last stage of discharge. A fairly large amount of the resin remained in the reaction vessel. The obtained resin was subjected to physical properties testing.

Comparative Example 3

A PVC was obtained by the same PVC polymerization process as in Example 1 except that the use of 0.004 part by weight of 2-mercaptoethanol was omitted and 0.05 part by weight of vinylpyrrolidone was used instead of 0.08 part by weight of polyvinylalcohol as the suspending agent.

Using this PVC, a white CPVC powder was obtained by the same chlorination reaction as in Example 1. On the occasion of slurry discharge, a resinous and uniform slurry was discharged. Almost no resin remained in the reaction vessel. The obtained CPVC was subjected to physical properties testing.

The results of physical properties testing of the CPVC obtained in Example 1 and Comparative Examples 1 to 3, and the powder characteristics of the PVCs are shown in Table 3.

TABLE 3

|   | Example 1 | Example 2 | Example 3 | Comparative Example 1 | Comparative Example 2 | Comparative Example 3 |
|---|---|---|---|---|---|---|
| A | 224 | 180 | 155 | 126 | 107 | 190 |
| B | 0.196 | 0.180 | 0.172 | 0.177 | 0.196 | 0.100 |
| C | 0.563 | 0.570 | 0.518 | 0.558 | 0.505 | 0.596 |
| D | 1000 | 1000 | 1000 | 1000 | 1000 | 1000 |
| E | good | good | good | good | bad | good |
| F | 192 | 194 | 251 | 387 | no falling | 184 |
| G | 222 | 226 | 239 | 299 | no falling | 212 |
| H | 105 | 105 | 105 | 90 | 105 | 90 |
| I | 1.5 | 1.6 | 1.1 | 2.9 | 1.2 | 3.4 |

In the above Table, the alphabetical letters denote the following:

A: Average particle diameter ($\mu$m) of the PVC.

B: Porosity (cc/g) of the PVC.
C: Bulk density (g/cc) of the PVC.
D: Viscosity average polymerization degree of the PVC.
E: Sedimentation tendency in the chlorination reaction process
F: Free flow property of the CPVC resin (seconds)
G: Free flow property of the CPVC compound (seconds)
H: Heat stability of the CPVC (blackening time:minutes)
I: Initial color of the CPVC (pressed plate: "a" value)

As clearly seen from the above Table 3, the process of the present invention prevents resin floating during the chlorination reaction for making CPVC and the CPVC obtained by the process of this invention has excellent free flow property, and further shows good resistance to initial discoloration as well as good heat stability at the time of heating and molding processing.

What is claimed is:

1. A process for the production of chlorinated polyvinyl chloride resins which comprises chlorinating a polyvinyl chloride resin which is prepared by suspension polymerization in an aqueous medium in a reaction vessel, the aqueous medium containing at least one polyvinyl alcohol as a suspending agent and also containing a chain transfer agent, the polyvinyl chloride resin having an average particle diameter of not less than 150 $\mu$m, porosity at 31–1,011 psi of not less than 0.15 cc/g and a bulk density of not less than 0.54 g/cc, the chlorinating of polyvinyl chloride resin being carried out by blowing chlorine gas into the aqueous suspension under UV irradiation with a mercury lamp in a temperature range of 40 to 90° C.

2. The process of claim 1, wherein said porosity is not less than 0.19 cc/g.

3. The process of claim 1 or 2, wherein the average particle diameter of the polyvinyl chloride resin is not less than 200 $\mu$m.

4. The process of claim 1 or 2, wherein the reaction vessel inside pressure during the chlorination reaction is in the range from 0 to 1.5 kg/cm$^2$.

5. A process for the production of chlorinated polyvinyl chloride resins, comprising preparing an aqueous suspension of a polyvinyl chloride resin by suspension polymerizing vinyl chloride with 0–20 parts by weight per 100 parts by weight of vinyl chloride of a monomer copolymerizable with vinyl chloride in an aqueous medium in a reaction vessel, the aqueous medium containing at least one polyvinyl alcohol having a degree of hydrolysis of 65–93 mole % as suspending agent and also containing a chain transfer agent, the polyvinyl chloride resin in the aqueous suspension having an average particle size of not less than 150 $\mu$m, porosity at 31–1,011 psi of 0.15 to 0.196 cc/g and bulk density of not less than 0.54 g/cc, and chlorinating the polyvinyl chloride resin by blowing chlorine gas into the aqueous suspension under UV irradiation with a mercury lamp in a temperature range of 40 to 90° C.

6. The process of claim 5, wherein the average particle diameter of the polyvinyl chloride resin is not less than 200 $\mu$m.

7. The process of claim 5 or 6, wherein the pressure in the reaction vessel during the chlorination reaction is in the range of 0 to 1.5 kg/cm$^2$.

8. The process of claim 5 or 6, wherein the degree of chlorination of the chlorinated polyvinyl chloride resin is 60–73% by weight.

9. The process of claim 5 or 6, wherein the degree of chlorination of the chlorinated polyvinyl chloride resin is 62–70% by weight.

* * * * *